United States Patent Office 3,838,079
Patented Sept. 24, 1974

3,838,079
PRESSURE SENSITIVE ADHESIVE COMPOSITION COMPRISING CARBOXYLATED POLYMER
Yujiro Kosaka, Masaru Uemura, Tokio Fujiki, and Mitsutaka Saito, Shin Nanyo-shi, Yamaguchi, Japan, assignors to Toyo Soda Manufacturing Co., Ltd., Shin Nanyo-shi, Yamaguchi, Japan
No Drawing. Filed Sept. 29, 1971, Ser. No. 184,920
Claims priority, application Japan, Aug. 9, 1971, 46/59,628
The portion of the term of the patent subsequent to July 31, 1990, has been disclaimed
Int. Cl. C09j 3/26
U.S. Cl. 260—27                                                5 Claims

ABSTRACT OF THE DISCLOSURE

A pressure sensitive adhesive composition is formed from 30 to 70% by weight, of a carboxylated polymer product obtained by copolymerizing maleic anhydride and an alkyl acrylate in contact with an ethylene vinyl acetate copolymer, and from 70 to 30%, by weight based on the total composition, of a tackifier and a viscosity reducing agent.

BACKGROUND OF THE INVENTION

Field of the Invention

This invention relates to a pressure sensitive adhesive composition having excellent adhesiveness and more particularly to an adhesive composition containing a polymeric composition formed by copolymerizing a maleic anhydride-alkyl acrylate monomer mixture in the presence of an ethylene-vinyl acetate copolymer.

Description of Prior Art

The term "adhesive," as used here, refers to a composition which has good adhesive properties even at room temperature, and when coated onto a substrate will possess adequate adhesiveness when only a slight pressure is applied. Most such adhesives, currently available, are either natural or synthetic rubber compositions, containing an organic solvent, or are emulsions containing an acrylic ester polymer, such as methyl methacrylate, butyl acrylate, or the like. Both types are usually modified with a tackifier, such as a rosin, or a rosin derivative, a terpene resin, a coumarone-indene resin, or the like. After application of the conventional adhesive to a substrate, such as paper, cellophane or cloth, the organic solvent or aqueous media vaporizes, as the adhesive is dried.

These currently available adhesives, suffer several disadvantages. In particular, when an organic solvent type composition is used, there are considerable health hazards and fire risks, which are present as the solvent is vaporized and the adhesive is dried. Moreover, the adhesive must be dried to a very high degree, which, of course, increases the manufacturing costs. Moreover, those compositions which use a rubber as its principal component, suffer in adhesive strength since they are poor in weatherability and are easily oxidized due to the presence of the double bonds in the rubber molecule chain.

It would be desirable, therefore, to provide an adhesive composition which does not require either a solvent or a water media. Such a composition, however, would have to have good processability and proper viscosity at the coating process temperatures. It should further have a high degree of bonding strength, and be pressure sensitive at ambient temperatures.

SUMMARY OF THE INVENTION

Accordingly, it is one object of this invention to provide a pressure sensitive adhesive composition which has good bonding strength at ambient temperatures and which either requires no volatile solvent, or in which an ordinary organic solvent is used which remains with the composition from the point of manufacture to the end use application.

It is a further object to provide a pressure sensitive adhesive composition as above, which has good processability and good viscosity characteristics at the coating temperatures.

These and other objects are herein provided by homogeneously mixing a molten polymeric composition, formed by copolymerizing a maleic anhydride-alkyl acrylate monomer mixture in contact with an ethylene-vinyl acetate copolymer with one or more modifiers, in the absence of any volatile material.

DETAILED DESCRIPTION OF THE PREFERRED EMBODIMENTS

The adhesive composition of this invention uses a polymeric mixture formed by copolymerizing maleic anhydrides and alkyl acrylate in contact with an ethylene-vinyl acetate copolymer. This copolymer is more specifically described and forms the subject matter of U.S. application Ser. No. 183,616, Sept. 24, 1971, now Pat. No. 3,749,756 filed concurrently herewith. As explained in more detail therein, the maleic anhydride-alkyl acrylate mixture is used in an amount of from 5 to 80 parts, by weight, to 95 to 20 parts by weight of said copolymer. The copolymer should preferably contain at least 15% vinyl acetate by weight, and more preferably, from 30–70%, by weight. The melt index of the product should be within the range of 1 to 300, as measured by Japanese Industrial Standard K6760.

Suitable alkyl acrylates used in forming this composition are those having the formula:

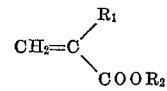

in which $R_1$ is H or $CH_3$ and $R_2$ is an alkyl radical of from 1 to 20 carbon atoms. For instance the said alkyl acrylate is methyl acrylate, ethyl acrylate, n-buytl acrylate, lauryl acrylate, stearyl acrylate, iso-butyl acrylate, t-butyl acrylate, 2-ethylhexyl acrylate, methyl methacrylate, butyl methacrylate, 2-ethylhexyl methacrylate, etc.

Two components are required as a modifier to the present adhesive composition. The first is a tackifier, such as natural rosin, gum rosin, wood rosin, or its dimer or rosin esters, such as like its glycerine ester, its pentaerythritol ester etc., or their derivatives or chlorinated triphenyl or a resin with a ring and ball softening point of above 40° C., selected from phenolic resins, alkyl phenolic resin of alkyl phenol of alkyl radical of 1 to 20 carbon atoms, coumarone-indene resins, petroleum resins and terpene resin, or a mixture thereof. The second component is a non-volatile viscosity reducing agent which is liquid at room temperatures, such as liquid coumarone-indene resin, liquid xylene-formaldehyde resin, liquid polybutene, liquid paraffin, liquid styrene resin or plasticizers, for example, dicarboxylic acid ester such as phthalic acid diester like dioctyl phthalate, dibutyl phthalate, diisodecyl phthalate, etc., and dioctyl sebacate, etc., or monocarboxylic acid ester, such as methyl acetyl ricinolate, etc., or phosphoric acid ester such as trioctyl phosphate, etc., or liquid chlorinated paraffin, chlorinated biphenyl etc., or glycolic acid ester, such as dipentaerythritol hexaester, etc., or mixtures thereof.

The reducing agents further improve the low temperature initial adhesive properties of the composition. This is particularly true when a mixture of liquid resins and liquid plasticizers are used.

Other modifiers may be used additionally and/or an antioxidant may be used. Suitable antioxidants include 4,4'-thio-bis(3-methyl-6-tertiary butyl phenol), 2,6-ditertiary-butyl cresol etc. which provides thermostabilization to the adhesive composition.

The said carboxylated polymer product may be used in an amount of 30% to 70% weight, and the modifiers may be used in an amount of from 70% to 30% by weight, depending upon the adhesive strength and other properties required. When less than 30% carboxylated polymer product is used, adequate adhesiveness cannot be obtained, and if used in an amount of greater than 70% by weight, the viscosity of the product becomes too high for easy application by coating.

The melt index of the carboxylated polymer product should be from 1 to 300 when used in the absence of an organic solvent. If the melt index is lower than 1, a homogeneous mixture cannot be obtained so that poor adhesion properties results. At a melt index of greater than 300 adhesive the stability against shearing creep at temperatures above ordinary ambient temperatures, suffers.

In preparing the pressure sensitive adhesive composition of this invention without a solvent, the first component of the modifier, such as the rosin, the second component of the modifier, such as coumaroneindene resin, and any other modifiers needed, are melted at 150° C. and then the carboxylated polymer product is added thereto. The mixture is homogeneously melt mixed, with stirring for 1 to 2 hours.

The present invention is based on the finding that when the above-described carboxylated polymer product is homogeneously mixed in its molten state, with at least the said modifier, the mixture can be coated onto substrates, such as paper, cellophane, plastic films and sheets, cloth, etc., at a desirable temperature, to provide a pressure sensitive adhesive of superior bonding strength, as compared with currently available rubber base adhesives. In particular, this composition provides superior adhesion stability against creep at temperatures above room temperature. Very important in this discovery, is the realization that this composition requires no ordinarily volatile materal during any part of the process.

The adhesive composition of this invention has excellent bonding strength under a rather wide range of temperatures above room temperature. It can be used for bonding a wide variety of substrates including, glass, ceramics, metals, woods, cellophanes and a wide range of plastics.

Modeover, the present composition can, if desired, be dissolved easily into a variety of organic solvents, so that it can be used in those applications currently requiring a rubber-base adhesive.

Adhesive strength and adhesive stability against shearing creep at temperatures higher than room temperature, were tested in accordance with the following methods:

The test sheets were prepared by uniformly coating kraft paper with a composition which was melt blended at 150° C., using a 0.003 inch doctor blade while heating, or which was prepared as a 50% toluene solution at 100° C., using a 0.006 inch blade. The tests of the adhesive strength were conducted in accordance with the Japanese Industrial Standard Z1523. A 0.2 mm. thick aluminum plate, Japanese Industrial Standard Code No. A1P1–H½, was used as a substrate. In testing adhesive strength, the test was conducted at a cross head speed of 33 mm./min., instead of 300 mm./min. as provided for in the Japanese Industrial Standard, because at 300 mm./min. it is impossible to break the kraft paper.

The adhesive strength of the pressure sensitive adhesive kraft paper tapes and cellophane tapes, which are representative rubber based pressure sensitive adhesive tapes currently commercially available was 1125 g./mm. and 760 g./25 mm., respectively, at a cross head speed of 300 mm./min.

The test of the adhesive stability was conducted as follows. An area of 12.7 mm. x 12.7 mm. at one end of the test sheet was bonded by finger pressure onto a substrate of 0.2 mm. thick aluminum plate of the Japanese Industrial Standard Code No. A1P1–H½, treated with chromic acid mixture. This test sheet was maintained 5 minutes at the testing temperature. Thereafter, the specimen was hung with a constant board (500 g.) on the lower end of the test sheet, at the testing temperature, and the time until the test sheet failed from substrate, was measured as the value of the adhesive stability.

The adhesive stability against shearing creep at higher temperatures for the pressure sensitive adhesive kraft paper tape and cellophane tape, which are representative rubber based pressure sensitive adhesive tape and acryl based pressure sensitive adhesive tape, commercially available, was 8 minutes and 80 minutes respectively, at 40° C.

Having generally described the invention, a better understanding can be attained by reference to certain specific examples which are provided herein for purposes of illustration only and are not intended to be limiting of the invention unless otherwise specified.

EXAMPLE 1

A polymer, having a melt flow index of 95, was formed by copolymerizing 7% maleic anhydride and 40% butyl acrylate in contact with 53% of an ethylene-vinyl acetate copolymer having a vinyl acetate content of 19%, 53% of this product, 30% of hydrogenated rosin glycerine ester, 3% of coumarone-indene resin, with a ring and ball softening point of 120° C., 10% of liquid coumarone-indene resin, with a viscocity, as determined in accordance with the Japanese Industrial Standard Z8803, of 30 centistokes, 10% of dioctyl phthalate, and 500 p.p.m. of 4,4'-thio-bis (3-methyl-6-tertiary butyl phenol), were blended in a molten state at 150° C. The adhesive strength of this composition was 1600 g./25 mm. in accordance with the above-mentioned method. The adhesive stability against shearing creep at higher temperatures as determined according to the above-mentioned method, was 6 hours at 40° C.

EXAMPLE 2

A polymer, having a melt flow index of 145, was prepared by copolymerizing 10% maleic anhydride and 55% octyl acrylate in contact with 35% ethylene-vinyl acetate copolymer having a vinyl acetate content of 42%. 33% of this product, 40% of hydrogenated rosin glycerine ester, 13% of coumarone-indene resin, with a ring and ball softening point of 120° C., 10% of liquid coumarone-indene resin with a viscosity, determined in accordance with the Japanese Industrial Standard Z8803, of 30 centistokes, 4% of dibutyl phthalate and 500 p.p.m. of 4,4'-thio-bis (3-methyl-6-tertiary-butyl phenol) were melt blended at 150° C. The adhesive strength of this composition could not be determined under the condition mentioned above because of failure of the substrate of the test sheet. The adhesive stability of this composition was 1 hour and 20 minutes at 40° C.

EXAMPLE 3

A product having a melt flow index of 92, was formed by copolymerizing 5% of maleic anhydride and 25% of 2-ethylhexyl acrylate, in contact with 71% of ethylene-vinyl acetate copolymer having a vinyl acetate content of 19%, 53% of this product, 30% of p-t-butyl phenol-formaldehyde resin, with a ring and ball softening point of 80–90° C., 2% of coumarone-indene resin with a viscosity of 30 centistokes, 7% of diisodecyl phthalate and 500 p.p.m. of 4,4'-thio-bis (3-methyl-6-tertiary butyl phenol) were melt blended at 150° C.

The adhesive strength of this composition was 1500 g./25 mm. and the adhesive stability was 16 hours at 40° C.

EXAMPLE 4

A product, having a melt flow index of 122, was formed by copolymerizing 6% of maleic anhydride and 44% of 2-ethyl hexyl acrylate, 50% of ethylene-vinyl acetate copolymer having a vinyl acetate content of 19%, 60% of that product, 27% of hydrogenated rosin glycerine ester, 9% of liquid xylene-formaldehyde resin with a viscosity, determined in 80% toluene solution at 20° C., of 60 centipoises, 4% of dioctyl phthalate and 500 p.p.m. of 4,4'-thio-bis (3-methyl 6-tertiary butyl phenol) were melt blended at 150° C. The adhesive strength of this composition could not be determined under the conditions mentioned above because of failure of the substrate of the test sheet. The adhesive stability was 2 hours and 30 minutes at 40° C.

EXAMPLE 5

A product having a melt flow index of 122, was formed by copolymerizing 5% of maleic anhydride and 33% of 2-ethyl hexyl acrylate, in contact with 52% of an ethylene-vinyl acetate copolymer having a vinyl acetate content of 19%, 56% of that product, 30% of chlorinated triphenyl, 10% of liquid coumarone-indene resin with a viscosity of 30 centistokes, 4% of methyl acetyl ricinolate and 500 p.p.m. of 4,4'-thio-bis (3-methyl-6-tertiary butyl phenol) was prepared at 100° C. as a 50% toluene solution. This solution was applied to kraft paper using a 0.006 inch doctor blade and the solvent was evaporated. The adhesive strength of this composition was 1500 g./25 mm. and the adhesive stability was 3 hours at 40° C.

EXAMPLE 6

A product, having a melt flow index of 23, was formed by copolymerizing 2% of maleic anhydride and 13% of 2-ethyl hexyl acrylate in contact with 85% of ethylene-vinyl acetate copolymer having a vinyl acetate content of 45%, 45% of the product, 38% of hydrogenated rosin glycerine ester, 13% of liquid styrene resin with softening point of 5° C., 4% of dioctyl sebacate, and 500 p.p.m. of 4,4'-thio-bis (3-methyl-6-tertiary butyl phenol) was prepared at 100° C. as an 80% toluene solution. This solution was applied to kraft paper using a 0.006 inch doctor blade and the solvent was evaporated. The adhesive strength of this composition was 1600 g./25 mm. and the adhesive stability was over 60 hours at 40° C., and 3 hours and 30 minutes at 50° C.

Having fully described the invention, it will be readily apparent to one of ordinary skill in the art that many changes and modifications can be made thereto without departing from the spirit and scope of the invention.

What is claimed and desired to be secured by Letters Patent of the United States is:

1. A pressure sensitive adhesive composition which comprises 30 to 70% by weight of a carboxylated polymer product obtained by copolymerizing 5 to 80 parts by weight of a monomeric mixture of maleic anhydride and an alkyl acrylate in contact with 95 to 20 parts by weight of an ethylene-vinyl acetate copolymer which contains at least 15% by weight vinyl acetate and from 70 to 30% by weight based on the total composition of a tackifier selected from the group consisting of natural rosin, gum rosin, wood rosin or its dimer or ester thereof, or hydrogenated rosin ester thereof, chlorinated terphenyl, a resin having a ring and ball softening point of above 40° C. selected from the group consisting of phenolic resins, alkyl phenolic resins, coumarone-indene resins, petroleum resins and terpene resins or mixtures thereof, and a nonvolatile viscosity reducing agent which is liquid at room temperature selected from the group consisting of coumarone-indene resin, xylene-formaldehyde resin, polybutene, paraffin, styrene resin, phthalic acid diester, dioctyl sebacate, or mixtures thereof, and which contains no organic solvent which volatilizes under end use conditions.

2. The composition of Claim 1, wherein the said carboxylated polymer product has the melt flow index of from 1 to 300.

3. The composition of Claim 1, wherein the ethylene-vinyl acetate copolymer contains vinyl acetate of more than 15% by weight.

4. The composition of Claim 1, wherein the said alkyl acrylate has the structure

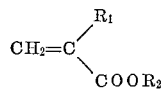

in which $R_1$ is hydrogen or methyl radical and $R_2$ is an alkyl radical of from 1 to 20 carbon atoms.

5. The composition of Claim 1, wherein the viscosity reducing agent is a mixture of liquid plasticizer or a liquid resin selected from the group consisting of liquid coumarone-indene resin, liquid xylene-formaldehyde resin, and liquid styrene resin.

References Cited

UNITED STATES PATENTS

| 3,423,382 | 1/1969 | Chibnik | 260—78.4 R |
| 3,749,756 | 7/1973 | Kosaka | 260—878 R |
| 3,232,895 | 2/1966 | Klein | 260—27 EV |

FOREIGN PATENTS

| 708,663 | 4/1965 | Canada | 260—27 EV |
| 946,384 | 1964 | Great Britain. | |

OTHER REFERENCES

Skeist: "Handbook of Adhesives," 1962, pp. 255–261.

DONALD E. CZAJA, Primary Examiner

W. E. PARKER, Assistant Examiner

U.S. Cl. X.R.

260—78.4 R, 78.5 R, 826, 829, 844